(12) United States Patent
Iwamura

(10) Patent No.: US 8,781,330 B2
(45) Date of Patent: Jul. 15, 2014

(54) OPTICAL REPEATER COMPLYING WITH REDUNDANT CONFIGURATION

(75) Inventor: Hideyuki Iwamura, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 142 days.

(21) Appl. No.: 13/483,087

(22) Filed: May 30, 2012

(65) Prior Publication Data

US 2013/0084067 A1 Apr. 4, 2013

(30) Foreign Application Priority Data

Sep. 29, 2011 (JP) ................................. 2011-215232

(51) Int. Cl.
*H04J 14/02* (2006.01)

(52) U.S. Cl.
USPC .................. 398/83; 398/48; 398/79; 398/45; 398/59; 398/173; 385/24; 385/37; 385/16; 385/17; 385/18

(58) Field of Classification Search
USPC ........... 398/83, 79, 82, 59, 85, 87, 45, 48, 49, 398/173, 174, 175, 180; 385/24, 37, 16, 17, 385/18
See application file for complete search history.

(56) References Cited

U.S. PATENT DOCUMENTS

| 6,185,023 B1* | 2/2001 | Mizrahi | 398/9 |
| 6,437,888 B1* | 8/2002 | Grasso et al. | 398/82 |
| 7,706,688 B2* | 4/2010 | Boudreault et al. | 398/59 |

FOREIGN PATENT DOCUMENTS

JP 2010-171684 A 8/2010

OTHER PUBLICATIONS

"Metro/Backbone WDM Equipment SpectralWave DW4200 Series", Product Introduction by NEC Corporation, on the website, http://www.nec.co.jp/spectralwave/dw4200, 2011.
Thomas Pfeiffer, "Converged Heterogeneous Optical Metro-Access Networks", ECOC 2010, Tu.5.B.1, IEEE, Sep. 19-23, 2010, Torino, Italy.

* cited by examiner

*Primary Examiner* — Hanh Phan
(74) *Attorney, Agent, or Firm* — Rabin & Berdo, P.C.

(57) ABSTRACT

An optical repeater formed in an optical passive component passively relays an incoming multiplexed optical signal. The repeater has an optical decoder decoding the multiplexed optical signal, and an optical encoder encoding an optical signal from a termination unit connected to the repeater. The repeater further includes a first optical path switch outputting an incoming multiplexed optical signal to the optical decoder and outputting the optical signal delivered from the optical decoder, a second optical path switch outputting the optical signal coming from the first optical path switch to the termination unit, and a third optical path switch outputting the optical signal coming from the second optical path switch to the encoder and outputting the optical signal delivered from the encoder.

9 Claims, 11 Drawing Sheets

OPTICAL REPEATER COMPLYING WITH REDUNDANT CONFIGURATION

BACKGROUND OF THE INVENTION

1. Field of the Invention

The present invention relates to an optical repeater, and more particularly to an optical repeater for use in an optical filter module employed in, for example, an optical access network.

2. Description of the Background Art

In recent years, telecommunications networks have enjoyed wider acceptance with a trend toward a strong demand for access networks having bandwidths of larger communication capacity. Furthermore, a development of networks having bandwidths of larger communication capacity would lead to accepting a variety of service demands from the users, thus possibly rendering traffic on access networks uneven in temporal and spatial distribution. Accordingly, with access networks, a novel network architecture is required to attain efficient network control.

As a network architecture that makes it possible to accomplish optimum communication capacity, currently discussed is a system which has an access network integrated with a metropolitan area network (MAN).

For example, "Metro/Backbone WDM Equipment SpectralWave DW4200 Series", Product Introduction by NEC Corporation, was searched for on the website, http://www.nec.co.jp/spectralwave/dw4200, on Mar. 24, 2011. The website presented an apparatus having a ROADM (Reconfigurable Optical Add-Drop Multiplexer) function for use in metropolitan area networks. The ROADM function is a reconfigurable multiplexing function of splitting or inserting an optical signal. Use of devices having the ROADM function as components constituting an access network may scale down the network to accomplish a flexible access ring.

Thomas Pfeiffer, "Converged Heterogeneous Optical Metro-Access Networks", ECOC 2010, Tu.5.B.1, IEEE, 19-23 Sep., 2010, Torino, Italy, describes a metropolitan area access network in which ROADM is integrated with a wavelength division multiplexing (WDM) filter for filtering wavelength division-multiplexed signals.

However, since the controllers described in the above-cited documents are of the active type, they involve the problem that they consume extensive electric power. In order to reduce the power consumption, it is necessary to perform control relying on passive routing.

For example, if a network is built using only WDM filters, then passive routing would be possible. However, the available wavelength band would be limitative. Therefore, in applications requiring a lot of communication channels, there may arise the problem that the wavelength resources would be exhausted.

In order to increase the number of channels, an optical wavelength multiplexing technique could be combined in hybrid with an optical code multiplexing technique. However, if passive optical components are implemented by the fiber Bragg grating (FBG) type of optical encoder and decoder, optical encoded or decoded signals would be carried only by reflected signals as taught in Japanese patent laid-open publication No. 2010-171684. Therefore, in a ring network topology as shown in FIG. 2A or a cascade network topology as shown in FIG. 2B, described later, a combination or division of optical waves may involve the problem that the passive optical components would be complicated in structure.

SUMMARY OF THE INVENTION

It is therefore an object of the present invention to provide an optical repeater made up of passive optical components of simple structure.

It is another object of the invention to provide a telecommunications system which has an access network integrated with a metropolitan area network using such an optical repeater made up of passive optical components and is applicable to a ring topology, a cascade topology or a topology having both topologies combined.

According to the present invention, an optical repeater passively relaying an incoming multiplexed optical signal includes an optical decoder decoding the multiplexed optical signal, and an optical encoder encoding an optical signal from a termination unit connected to the repeater. The repeater further includes a first optical path switch outputting an incoming multiplexed optical signal to the optical decoder and outputting the optical signal delivered from the optical decoder, a second optical path switch outputting the optical signal coming from the first optical path switch to the termination unit, and a third optical path switch outputting the optical signal coming from the second optical path switch to the encoder and outputting the optical signal delivered from the encoder.

In an aspect of the invention, an optical repeater passively relaying a multiplexed optical signal comprises: a first and a second input/output port each receiving and outputting the multiplexed optical signal; an optical decoder decoding the multiplexed optical signal to a first optical signal; a first optical path switch outputting the multiplexed optical signal to the optical decoder and outputting the first optical signal entering from the optical decoder; a second optical path switch outputting the first optical signal received from the first optical path switch to a termination unit connected to the repeater and outputting a second optical signal delivered from the termination unit; an optical encoder encoding the second optical signal to a third optical signal; a third optical path switch outputting the second optical signal entering from the second optical path switch to the optical encoder and outputting the third optical signal; a fourth optical path switch outputting the multiplexed optical signal received on the first input/output port to the first optical path switch and outputting the third optical signal delivered from the third optical path switch to the first input/output port; and a fifth optical path switch outputting the multiplexed optical signal received on the second input/output port to the optical encoder and outputting the first optical signal delivered from the optical decoder to the second input/output port.

In another aspect of the invention, an optical repeater arrangement may include a first and a second optical repeater corresponding to the optical repeaters stated above, and further a first wave combiner/separator separating wavelengths of a multiplexed optical signal entering from a first port to output the separated wavelengths of signal to the first and second optical repeaters, and combining optical signals entered from the first and second optical repeaters into one, which is in turn output on the first port, a second wave combiner/separator separating wavelengths of optical signal delivered from the termination unit on a second port to output the separated wavelengths of optical signal to the first and second optical repeaters, and outputting optical signals entered from the first and second optical repeaters on the second port, and a third wave combiner/separator separating wavelengths of a multiplexed optical signal entering on a third port to output the separated wavelengths of optical signal to the first and second optical repeaters, and combining optical signals entering from the first and second optical repeaters into one, which is in turn output on the third port.

In a further aspect of the invention, an optical repeater system relaying a multiplexed optical signal between a first optical network and a second optical network includes a wave separator for separating wavelengths of a multiplexed optical signal entering from the first optical network, a plurality of optical path switches outputting the wavelengths of optical signal separated by the wave separator to the second optical network, or outputting an optical signal entering from the second optical network, and a wave combiner combining optical signals delivered from the optical path switches into one, which is in turn output to the first optical network.

According to the present invention, the optical repeater that works as a passive optical component can be made simpler in structure. Furthermore, use of an optical repeater working as a passive optical component according to the present invention makes it possible to implement a telecommunications system which has an access network integrated with a metropolitan area network and is applicable to a ring topology, a cascade topology or a topology having both topologies combined.

The inventive concept disclosed in the application may also be defined in ways other than in the claims presented below. The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Now, with reference to FIGS. 1 and 2A, a first illustrative embodiment of the optical repeater according to the present invention will be described in detail. The first illustrative embodiment is exemplarily directed to an application in which the optical repeaters constitute a ring topology network.

Figure 2A:
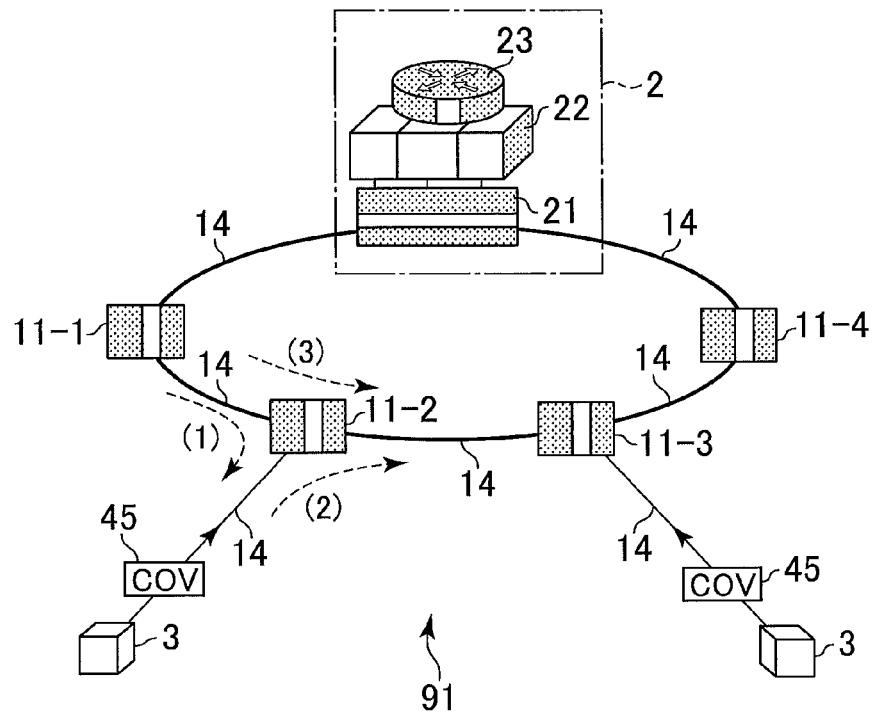
FIG. 2A schematically shows an example of ring topology network.

FIG. 2A shows an exemplified configuration of a ring topology network 91, which is an optical communication network formed by optical fibers 14 functioning as communication transmission media. The network 91 is formed by a central office 2 to which the optical fibers 14 interconnect a plurality (four, in the embodiment) of optical hybrid filters (OHFs) 11-1 to 11-4, generally 11, which are passive optical components to form the ring topology network 91. In the illustrative embodiment, two of the OHFs 11-2 and 11-3 have two respective optical network units (ONUs) 3 connected by respective wavelength converters 45. Note that the numbers of the ONUs 3 and the OHFs 11 may be exemplified and no restriction may be imposed thereon.

The central office 2 includes communication equipment comprised of a route control 21, an optical line terminal (OLT) 22, and a router 23.

The router 23 is connected to the network 91 and to another telecommunications network, not shown, to route signals between both networks.

The OLT 22 is line termination equipment provided in the central office premises to establish optical communications with the OHFs 11 over the optical fibers 14. Optical transmission schemes applicable may be an optical wavelength multiplexing scheme, an optical code division multiplexing scheme or a hybrid scheme having both schemes combined. The first illustrative embodiment is exemplarily directed to a hybrid transmission having the optical wavelength multiplexing and optical code division multiplexing incorporated. The route control 21 includes a fiber Bragg grating (FBG) type of optical encoder and optical decoder, not shown, to encode and decode signals.

The route control 21 is adapted to control routing between the OLT 22 and the OHFs 11. In this embodiment, no restriction may be placed on the way of routing implemented by the route control 21 but various ways may be employed.

For example, the route control 21 may include one or more optical generators, not shown, adapted for generating different wavelengths of light, e.g. $\lambda 5$, $\lambda 7$, described later, and a switch, also not shown, adapted for switching the wavelengths. The route control 21 may be adapted for monitoring the transmission state of upstream and downstream optical signals. When upstream or downstream optical signals cannot be transmitted or received due to a fault or trouble, the route control 21 causes the switch to switch the used wavelength to another of the wavelengths.

The route control 21 may include one or more coded-light generators, such as FBGs, not shown, adapted for generating different coded optical signals, e.g. Code1, Code2, and a switch, also not shown, adapted for switching the generated code. The route control 21 may be adapted for monitoring the transmission state of upstream and downstream optical signals. When upstream of downstream optical signals cannot be sent or received due to malfunction, the route control 21 instructs the switch to switch the used code to another of the codes.

The wavelength converters 45 are connected to their respective ONUs 3 to switch, or convert, the wavelengths in the upstream or downstream direction to the corresponding ONUs 3. This permits the wavelengths used in the upstream and downstream directions to be switched when a fault occurs.

For instance, when the wavelength converter 45 fails to receive an upstream optical signal from the corresponding ONU 3, it determines that a fault has occurred and switches the wavelength used in the upstream direction to a different wavelength. The invention may not be limited to this example of operation.

In the above example, the wavelength converters 45 are physically separate from the ONUs 3. With the present illustrative embodiment, the wavelength converters 45 may not be limited to this example of structure. For example, the wavelength converter 45 may be integrated in structure with the ONU 3, that is, the wavelength converter 45 may be incorporated in the ONU 3.

The ONU 3 is line termination equipment set in the user's premises. The ONU 3 may be connected to a terminal device, such as a personal computer, PDA (personal digital assistant), cellular phone, e-book reader, portable game unit, not shown, to establish optical communications with the OLT 22 over the optical fiber 14. The ONU 3 is adapted to receive decoded downstream optical signals sent by the wavelength converter 45. The ONU 3 is also adapted to send upstream optical signals to the wavelength converter 45. The OHFs 11-1 to 11-4, generally 11, are optical repeaters located between the OLT 22 and their respective ONUS 3 to constitute the ring topology network 91. For convenience of illustration, the OHFs 11-1 to 11-4 may be the same in structure as each other, and may generally be designated with a reference numeral 11.

Now, returning to FIG. 1, the internal configuration of one OHF 11 according to the first embodiment will be described. The OHFs 11-1 to 11-4 may be identical in internal structure with each other, and therefore FIG. 1 representatively shows the OHF 11-2 connected to the corresponding ONU 3 in a plan view.

Figure 1:
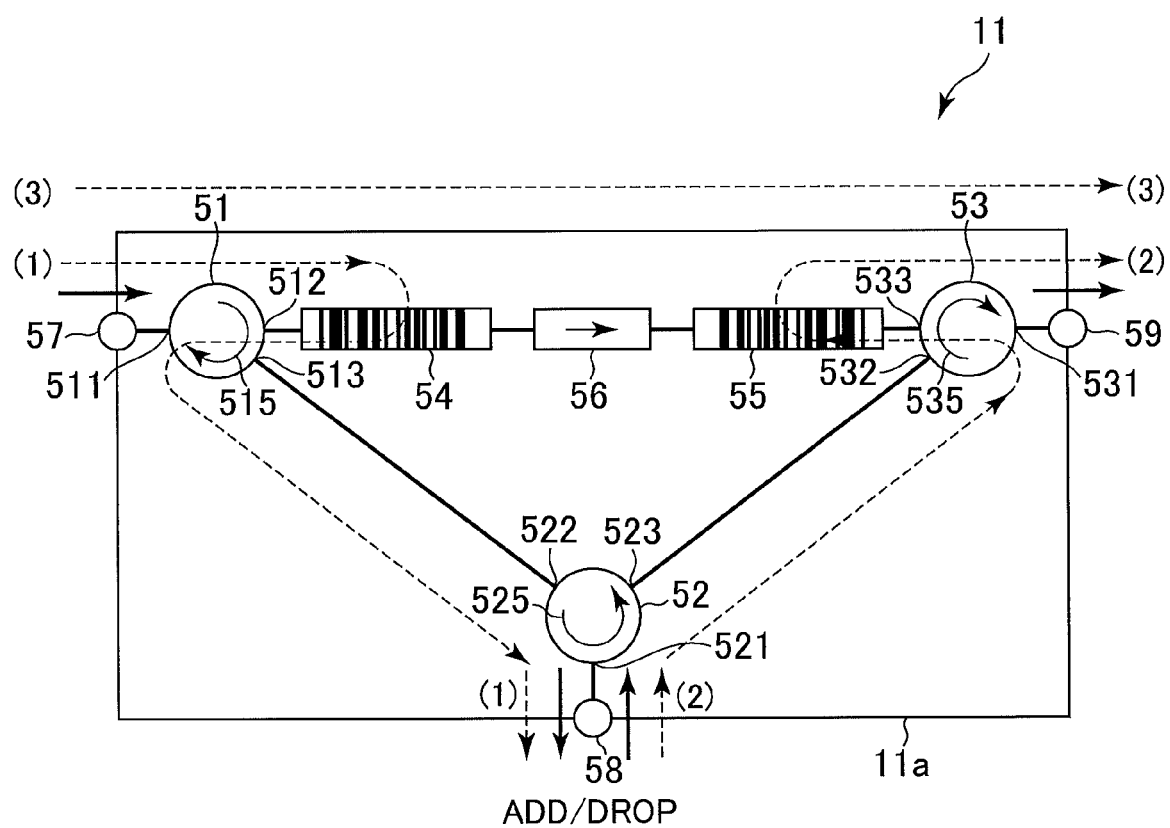
FIG. 1 schematically shows in a plan view the internal structure of an optical hybrid filter (OHF) according to a first illustrative embodiment of the present invention.

The OHF 11 shown in FIG. 1 includes three circulators 51, 52 and 53, two optical decoders 54 and 55 of fiber Bragg grating (FBG) type, and an isolator 56, which are arranged on a substrate 11a as shown. The circulators 51, 52 and 53 may function as optical path switches as will be understood later on.

The circulator 51 is a passive module having its port 511 connected to a port 57 and adapted for receiving an optical signal on one of the ports 511, 512 and 513 to output the signal from one of the ports which is selected under a predetermined rule as described later.

In FIG. 1, the arrows put with respect to the circulator 51 indicate the input-to-output relationship of an optical beam. For example, the circulator 51 has its three ports 511, 512 and 513 interconnected to the port 57, the FBG type optical decoder 54 and the circulator 52, respectively.

In the circular 51, for example, when an optical signal on the port 57 enters the port 511, the circulator 51 outputs the optical signal from the port 512 adjacent in the circulating direction depicted with an arrow 515 to the port 511. Similarly, when an optical signal enters on the port 512, for example, the circulator 51 outputs the optical signal from the port 513 adjacent to the port 512 in the circulating direction 515.

The remaining circulators 52 and 53 may operate on the same principle as the circulator 51 so as to receive an optical signal on one port to output the signal from another port selected under the predetermined rule in the directions depicted with arrows 525 and 535, respectively.

The circulator 52 has its ports 521, 522 and 523 interconnected to a port 58, the circulator 51 and the circulator 53, respectively. The circulator 53 has its ports 531, 532 and 533 interconnected to a port 59, the circulator 52 and the FBG type optical encoder 55, respectively.

The FBG type optical decoder 54 is adapted to decode a signal having one of the wavelength components of the incoming optical signal 512 having wavelengths multiplexed. Signals may thus be designated with reference numerals of connections or ports on which they appear.

The FBG type optical decoder 54 has a fiber Bragg grating (FBG) adapted to reflect an incoming optical signal under the Bragg condition on the FBG to output a resultant, decoded optical signal. The reflected, decoded optical signal is conveyed toward the port 513 within the circulator 51. The FBG type optical decoder 54 is designed to decode a signal having a wavelength component assigned to the ONU 3 connected to the OHF 11-2 having the optical decoder 54 installed. The FBG type optical decoder 54 is adapted to feed the isolator 56 with optical signals having wavelengths other than the decoded wavelength component.

The isolator 56 is adapted to receive the optical signal from the FBG type optical decoder 54 to output the signal to the FBG type optical encoder 55. The isolator 56 has a function of permitting the optical signal to travel only in one direction and of blocking a light beam from travelling in the opposite direction.

The FBG type optical encoder 55 has an FBG adapted to encode the optical light beam entered on the port 533 of the circulator 53 to FBG coding. Thus, an optical signal reflected under the Bragg condition by the FBG is output as an encoded optical signal 533. The reflected, encoded optical signal will be directed to the port 531 within the circulator 53. The FBG type optical encoder 55 is further adapted to receive the optical signal 533 from the isolator 56 to direct the signal also to the port 531 within the circulator 53.

The FBG type optical encoder 55 and decoder 54 may be designed to, respectively, encode and decode optical signals by means of commonly existing FBG types of encoding and decoding. For example, the phase encoding, wavelength hopping or any other types of coding can be employed.

The operation of the OHFs 11 constituting the ring topology network 91 of the first embodiment will next be described. Specifically with reference to FIG. 2A, an example is taken when an optical signal is applied to the OHF 11-2. The dotted lines indicate the directions of flows of optical signals. Dotted lines (1) (2) and (3) shown in FIG. 1 are correspondingly shown in FIG. 2A.

Specifically, as can be seen from FIG. 2A, the dotted line (1) indicates an optical signal in the downstream direction, i.e. from OLT 22 toward ONU 3 in this example, meant for the ONU 3 connected to the OHF 11-2. The dotted line (2) indicates an optical signal in the upstream direction from the ONU 3, i.e. from the ONU 3 toward the OLT 22 in this example. The dotted line (3) indicates an optical signal passing through the OHF 11-2.

When a downstream optical signal directed to the ONU 3 indicated by the dotted line (1) enters on the port 57, it is input to the port 511 of the circulator 51. The downstream optical signal then exits from the port 512 of the circulator 51 and enters the FBG type optical decoder 54.

The FBG type optical decoder 54 decodes the incoming optical signal of the wavelength component and returns the decoded signal as a reflected optical signal again to the port 512 of the circulator 51.

The optical signal entering on the port 512 of the circulator 51 is output from the port 513 and enters the port 522 of the circulator 52. The optical signal received on the port 522 of the circulator 52 is output from the port 521 to exit from the port 58.

When an upstream optical signal from the ONU 3 indicated by the dotted line (2) enters the port 58, it is applied to the port 521 of the circulator 52.

The upstream optical signal exits from the port 523 of the circulator 52 and is applied to the port 532 of the circulator 53. The optical signal input on the port 532 of the circulator 53 is developed from the port 533 and is applied to the FBG type optical encoder 55.

The FBG type optical encoder 55 thence encodes the incoming optical signal and returns the encoded signal to the port 533 of the circulator 53 as a reflected optical signal.

The optical signal arriving on the port 533 of the circulator 53 is output from the port 531 and will then exit from the port 59.

When an optical signal, which will pass through the OHF 11 as indicated by the dotted line (3), enters on the port 57, it is applied to the port 511 of the circulator 51. The optical signal is output from the port 512 of the circulator 51 and input to the FBG type optical decoder 54. This optical signal has wavelengths other than the wavelength component assigned to the ONU 3. Hence, the optical signal passes through the FBG type optical decoder 54 and is applied to the port 533 of the circulator 53 through both the isolator 56 and the FBG type optical encoder 55. The optical signal input on the port 533 of the circulator 53 is output from the port 531 and will exit from the port 59.

In short, according to the first illustrative embodiment, it is possible to provide an optical hybrid filter (OHF) that uses a passive module and is simple in structure to comply with a ring topology.

Furthermore, according to the first embodiment, it is possible to perform parallel processing on sending a downstream signal, after optically decoded, toward the ONU, sending an upstream signal coming from the ONU, after optically encoded, to a passive optical component on a node following thereto, and transferring a light beam directly to a passive optical component on the following node connected in the form of ring without performing optical encoding or decoding.

A second, alternative embodiment of the optical repeater of the present invention will next be described in detail with reference to FIGS. 2B and 3. The alternative embodiment is exemplarily directed to an application in which the optical repeaters constitute a cascade topology network.

Figure 2B:
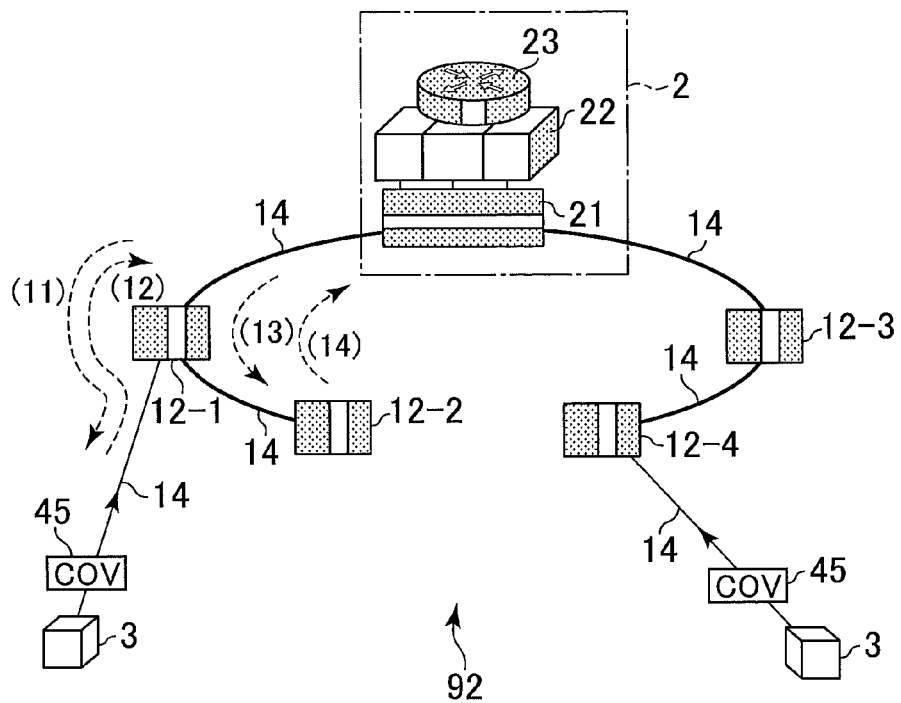
FIG. 2B schematically shows, like FIG. 2A, an example of cascade topology network.

First, reference will be made to FIG. 2B showing the configuration of a cascade topology network 92, which is an optical network using the optical fibers 14 as communication transmission media. Throughout the patent application, like components are thus designated with the same reference numerals. The network 92 is formed by the central office 2, to which the optical fibers 14 interconnect a plurality (four, in the embodiment) of OHFs 12-1 to 12-4, generally 12, which are passive optical components to form the cascade topology network 92. In the alternative embodiment, two of the OHFs 12-1 and 12-4 have two respective ONUs 3 connected by the respective wavelength converters 45. Of course, the numbers of the ONUS 3 and the OHFs 12 may be exemplified and no restriction may be imposed thereon. Like the first illustrative embodiment, the central office 2 may include the route control 21, OLT 22 and router 23. The ONU 3 may be a terminal device installed in the user's premises, like the first embodiment.

The OHFs 12-1 to 12-4 are positioned between the OLT 22 and their respective ONUs 3 and are optical repeaters constituting the cascade topology network 92. Thus, the OHFs 12 establish optical communications in opposite directions. For convenience of description, the OHFs 12-1 to 12-4 may generally be designated with a reference numeral 12.

The OHFs 12-1 to 12-4 may be identical in internal configuration. Therefore, description will be made with reference to FIG. 3, which representatively shows in a plan view the internal configuration of one OHF 12 of the second embodiment, which may be the OHF 12-1 connected to the corresponding ONU 3.

Figure 3:
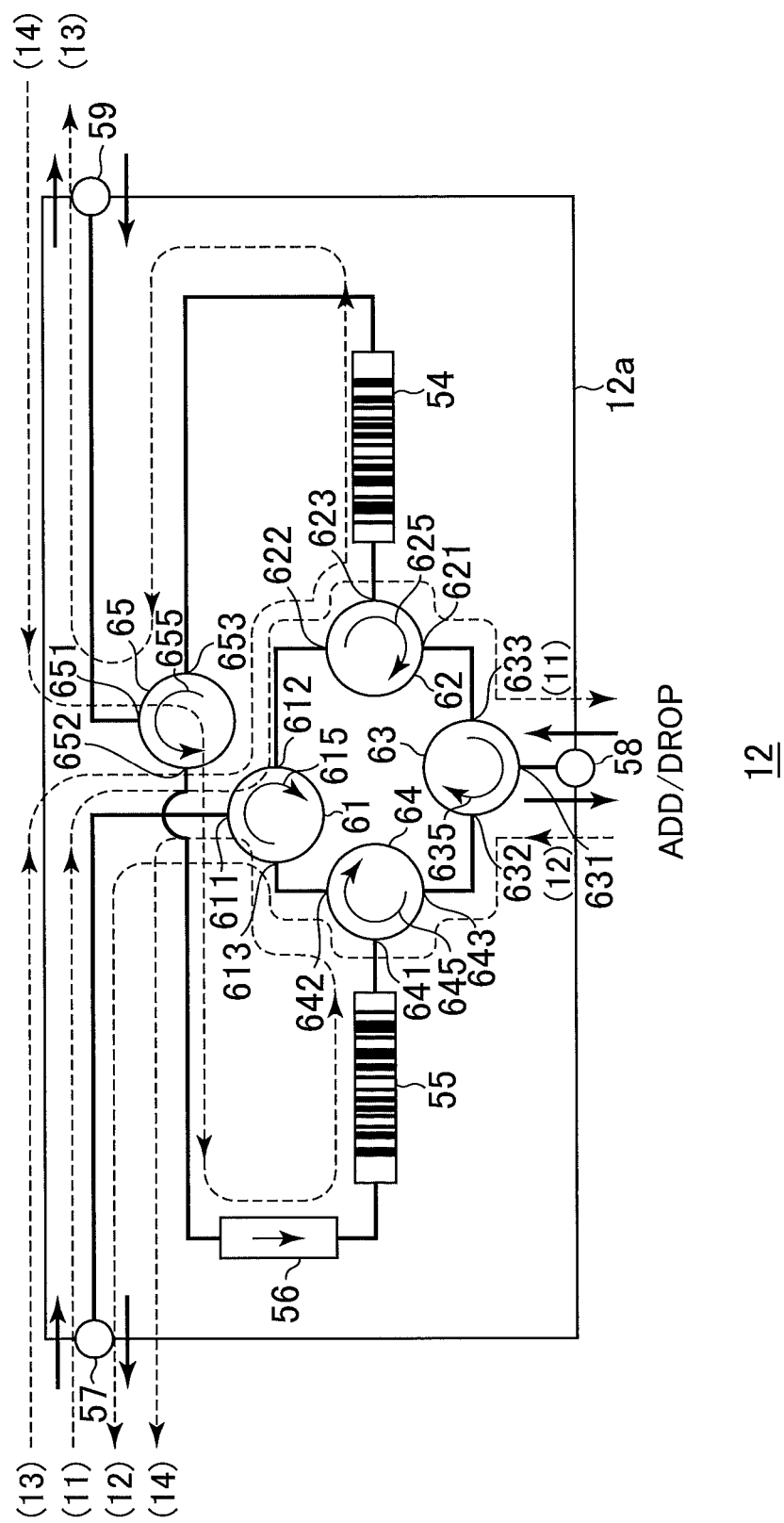
FIG. 3 schematically shows, like FIG. 1 in a plan view, the internal structure of an OHF according to a second illustrative embodiment of the invention.

As understood from FIG. 3, the OHF 12 has five circulators 61-65 in addition to the FBG type optical decoder 54, FBG type optical encoder 55 and isolator 56, which are formed on a substrate 12a as illustrated. The circulators 62, 63, 64, 61 and 65 may be understood as functioning as optical path switches.

The circulators 61-65 may be operable on the basis of the same principle as the circulator 51-53 of the first embodiment, namely adapted to receive an optical signal on one port to output the signal from another port in the circulating directions 615-655, respectively.

The circulator 61 has its ports 611, 612 and 613 interconnected to the port 57, the circulator 62 and the circulator 64, respectively. The circulator 62 has its ports 621, 622 and 623 interconnected to the circulator 63, the circulator 61 and the FBG type optical decoder 54, respectively. The circulator 63 has its ports 631, 632 and 633 interconnected to the port 58, the circulator 64 and the circulator 62, respectively. The circulator 64 has its ports 641, 642 and 643 interconnected to the FBG type optical encoder 55, the circulator 61 and the circulator 63, respectively. The circulator 65 has its ports 651, 652 and 653 interconnected to the port 59, the isolator 56 and the FBG type optical decoder 54, respectively.

The isolator 56 is adapted to transfer the optical signal coming from the circulator 65 to the FBG type optical encoder 55.

The FBG type optical encoder 55 is connected to the isolator 56 and the circulator 64. The FBG type optical decoder 54 is connected to the circulators 62 and 65.

The operation of the OHFs 12 constituting the cascade topology network 92 of the second embodiment will next be described. Specifically with reference to FIG. 2B, an example is taken when an optical signal is applied to the OHF 12-1. Dotted lines (11)-(14) shown in FIG. 3 indicate the directions of optical signals flowing, and are correspondingly shown in FIG. 2B.

Specifically, in FIG. 2B, the dotted line (11) indicates an optical signal in the downstream direction directed to the ONU 3 coupled to the OHF 12-1. The dotted line (12) indicates an optical signal in the upstream direction from the ONU 3. The dotted line (13) indicates a downstream optical signal passing through the OHF 12-1, and the dotted line (14) indicates an upstream optical signal passing through the OHF 12-1.

When a downstream optical signal directed to the ONU 3 and indicated by the dotted line (11) enters on the port 57, it is input to the port 611 of the circulator 61. The optical signal is output from the port 612 of the circulator 61, and enters the port 622 of the circulator 62 to exit from the port 623 to be input to the FBG type optical decoder 54.

The FBG type optical decoder 54 in turn decodes the incoming optical signal of the wavelength component and returns the resultant, decoded optical signal as a reflected optical signal to the port 623 of the circulator 62.

The optical signal input on the port 623 is output from the port 621 of the circulator 62 and enters the port 633 of the circulator 63. This optical signal is output from the port 631 and will exit from the port 58.

When an upstream optical signal coming from the ONU and indicated by the dotted line (12) enters on the port 58, it passes into the port 631 of the circulator 63. The optical signal on the port 631 is output from the port 632 and enters the port 643 of the circulator 64. The signal on the port 643 is then output from the port 641 and enters the FBG type optical encoder 55.

The FBG type optical encoder 55 encodes the incoming optical signal and returns the encoded signal as a reflected optical signal to the port 641 of the circulator 64.

The optical signal entering on the port 641 of the circulator 64 is output from the port 642 and enters the port 613 of the circulator 61. The optical signal on the port 613 is output from the port 611 and will exit from the port 57.

When a downstream optical signal passing the OHF 12-1 and indicated by the dotted line (13) enters on the port 57, it passes into the port 611 of the circulator 61.

The optical signal fed on the port 611 is output from the port 612 to the port 622 of the circulator 62. This signal beam is then output from the port 623, and enters the FBG type optical decoder 54. It may be recalled that that optical signal has a wavelength other than the wavelength components assigned to the ONU 3. Hence, the optical signal passes through the FBG type optical decoder 54 and enters the port 653 of the circulator 65. The optical signal fed on the port 653 is output from the port 651 and will exit from the port 59.

When an upstream optical signal passing through the OHF 12-1 and indicated by the dotted line (14) enters on the port 59, it passes into the port 651 of the circulator 65.

The optical signal entering into the port 651 is output from the port 652 to the isolator 56, and passes into the FBG type optical encoder 55.

The optical signal supplied on the isolator 56 passes through the FBG type optical encoder 55 to the port 641 of the circulator 64, and exits from the port 642. Then, the optical signal enters the port 613 of the circulator 61, and is output from the port 611, and will be developed from the port 57.

In summary, according to the second, alternative embodiment, an OHF capable of complying with a cascade topology network can be provided with a simple structure employing passive modules.

Furthermore, according to the second embodiment, it is possible to perform parallel processing on transmitting a downstream signal, after optically decoded, toward an ONU, transmitting an upstream signal coming from the ONU in the opposite direction, after optically encoded, to a passive optical component on a node preceding thereto, sending an optical signal directly to a passive optical component on a node following thereto without performing optical encoding or decoding, and sending a signal coming from a passive optical component on a node following thereto directly in the opposite direction without performing optical encoding or decoding.

A third, alternative embodiment of the optical repeater of the present invention will be described in detail by referring to FIGS. 4 through 10. The third embodiment is adapted to a hybrid transmission system combining optical wavelength division multiplexing with optical code division multiplexing. This alternative embodiment may exemplarily be applied to optical repeaters forming a hierarchical network having multiple layers associated with different wavelengths.

Figure 4:
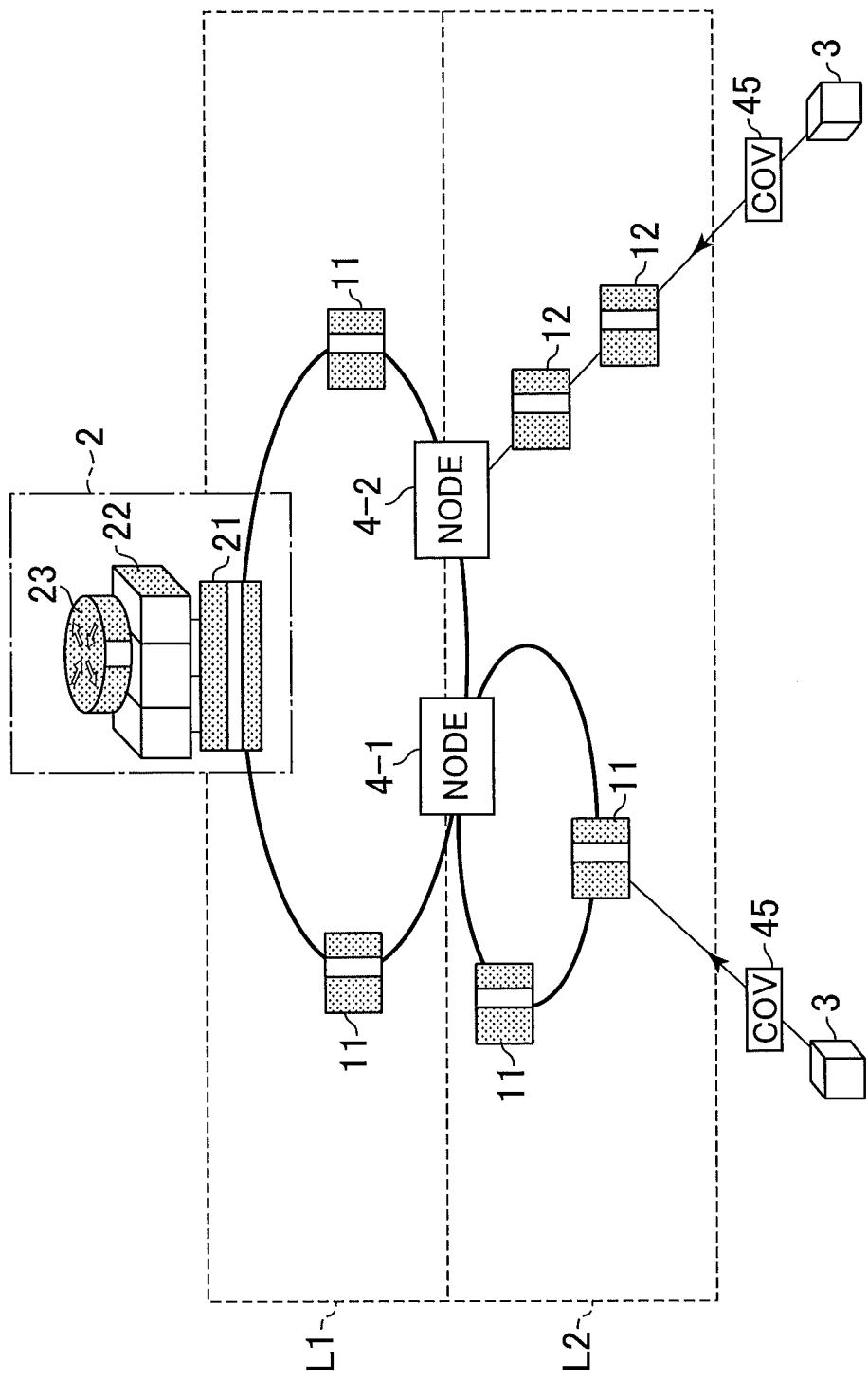
FIG. 4 schematically shows the configuration of a multi-layered network according to a third illustrative embodiment of the invention, the network having multiple layers associated with respective wavelengths.

FIG. 4 shows such a hierarchical network configuration, which has multiple, e.g. two, layers associated with wavelengths. In the system shown, at the boundary between the first and second hierarchical layers L1 and L2, installed are two wavelength division multiplexing (WDM) nodes 4-1 and 4-2. The one WDM node 4-1 is connected to a network of ring topology in the second layer L2, and the other WDM node 4-2 is connected to a network of cascade topology in the second layer L2. The networks of the ring topology and the cascade topology are assigned to wavelengths different in wavelength from each other between the upstream and downstream directions.

As seen from FIG. 4, the network thus hierarchized and connected in multiple layers for different wavelengths may increase the number of connected OHFs. When such a network is implemented as a backbone network, for example, for a wireless system, it is necessary to introduce redundancy to the network in order to enhance the system reliability.

Figure 5:
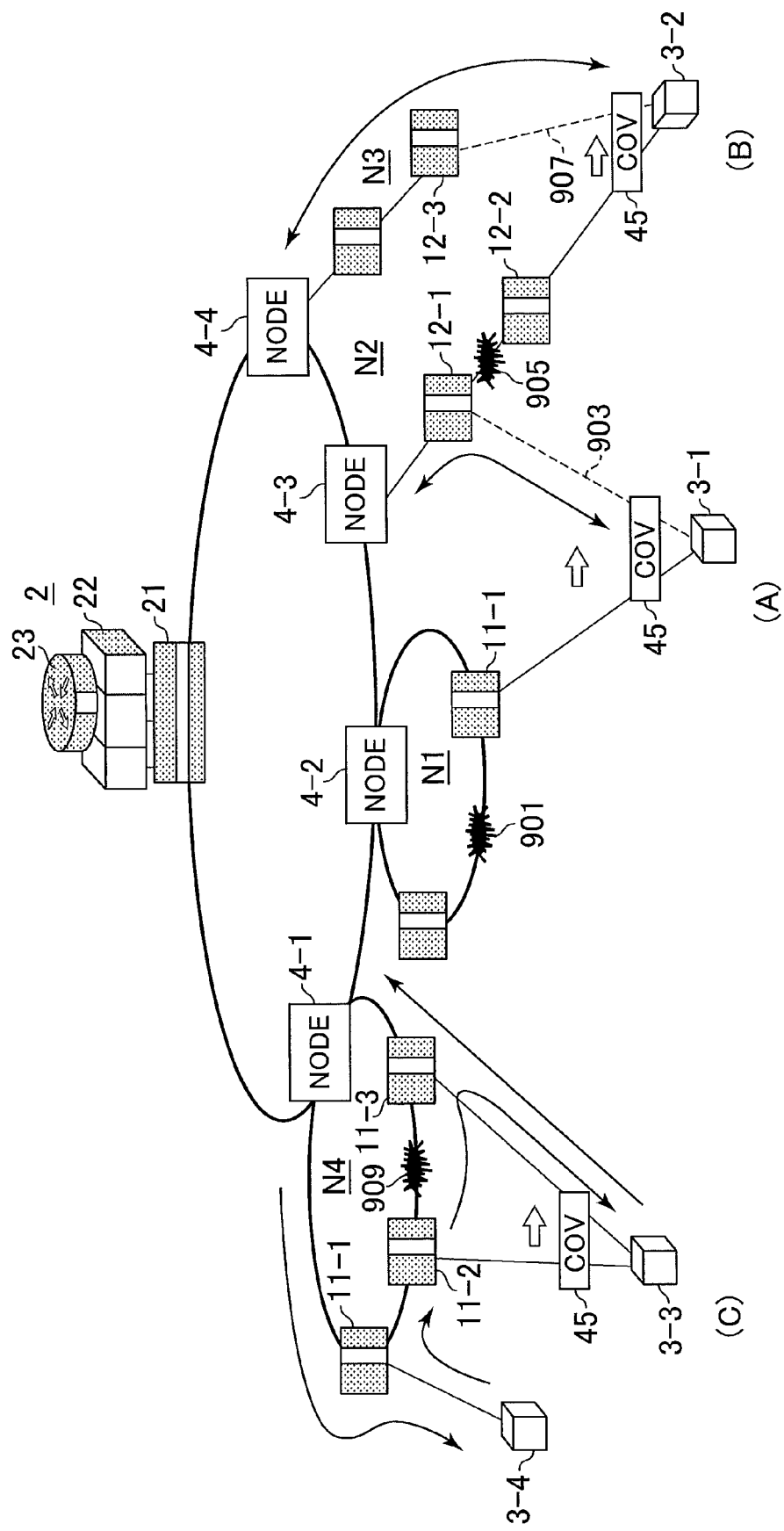
FIG. 5 is a network diagram useful for understanding how to implement redundancy in the multi-layered network according to the third illustrative embodiment.

With reference to FIG. 5, it will be described how to implement redundancy on a hierarchical network having multiple layers associated with respective, different wavelengths. FIG. 5 shows three exemplified cases (A) (B) and (C) generally classified with respect to redundancy or diversity configuration.

In case (A) shown in FIG. 5, a fault, or failure, 901 has occurred on a ring topology network N1. Communications to and from the ONU 3-1 connected to the OHF 11-1 constituting the ring topology network N1 may be affected. In this case, redundancy may be configured by selectively connecting the ONU 3-1 to an OHF 12-1 constituting a cascade N2 in its vicinity as depicted with a dotted line 903.

In case (B) shown in FIG. 5, a fault 905 has occurred on the cascade topology network N2. Communications to and from the ONU 3-2 connected to an OHF 12-2 constituting the cascade network N2 may be affected. In this case, redundancy may be established by selectively connecting the ONU 3-2 to an OHF 12-3 constituting a different type of topology N3 as depicted with a dotted line 907.

In case (C) shown in FIG. 5, a fault 909 has occurred on a ring topology network N4. In this case, redundancy may be attained by setting a connection to another OHF constituting the same ring topology N4. The arrows shown in this figure indicate the flows of upstream and downstream signals through the ONUS. For example, in this case (C), redundancy may be set up by selectively switching the connection from the ONU 3-3, which has been connected to the OHF 11-2, to another OHF 11-3.

In cases (A) and (B), selective connections may be accomplished by applying the OHFs 11 and 12 in accordance with the first and second illustrative embodiments. In case (C), however, disconnection occurs on the line at the faulty or malfunctioning location 909, as shown in FIG. 5, where upstream optical signals from the ONU 3-4 and downstream optical signals to the ONU 3-3 would not be transmitted. According to the third, alternative embodiment, the optical repeater is capable of configuring redundancy in this case (C).

Figure 6:
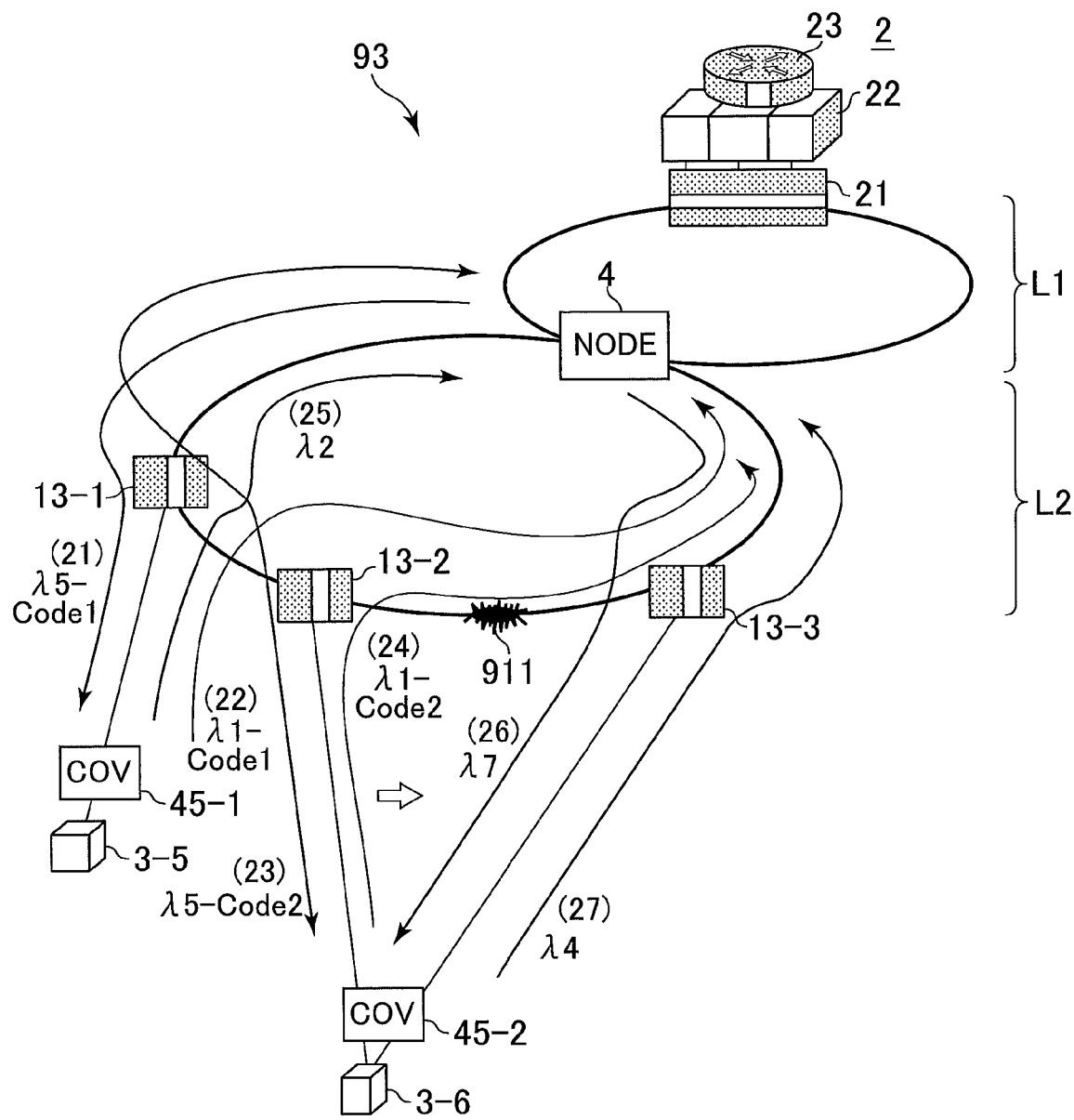
FIG. 6 schematically shows the configuration of a network according to the third embodiment.

FIG. 6 shows the configuration of a network 93 of the third embodiment. With the exemplified system, the network 93 is formed by the central office 2, WDM node 4, two ONUs 3-5 and 3-6, three OHFs 13-1 to 13-3, and wavelength converters (COV) 45-1 and 45-2. Note that those are mere examples, and no restriction may be imposed on the numbers of ONUs, OHFs, wavelength converters or WDM nodes.

The network 93 is constituted of first and second hierarchical networks L1 and L2. The multiple layers are connected for respectively different wavelengths. The second hierarchical network L2 forms a ring topology.

As with the first and second embodiments, the central office 2 may include the route control 21, OLT 22 and router 23.

The WDM node 4 is adapted to divide or combine optical signals and relay the optical signals between the first and second hierarchical networks L1 and L2. The ONUs 3 may be terminal devices installed in the users' premises as with the first illustrative embodiment.

The wavelength converters 45-1 and 45-2 are connected to the ONUS 3-5 and 3-6, respectively, and are adapted to switch the wavelengths in the upstream and downstream directions for the ONUS 3-5 and 3-6. Upon the occurrence of a fault 911, the wavelength converters 45-1 and 45-2 may thus switch the wavelengths for use in the upstream and downstream directions.

Under the situation shown in FIG. 6, when the wavelength converter 45-1 is normally operable to modulate, for example, wavelengths $\lambda 5$ and $\lambda 1$ in the downstream and upstream directions, respectively, to the ONU 3-5, the occurrence of a fault 911 will cause only a wavelength $\lambda 2$ to be modulated in the upstream direction. When the wavelength converter 45-2 is normally operable to modulate the wavelengths $\lambda 5$ and $\lambda 1$ in the downstream and upstream directions, respectively, to the ONU 3-6, the occurrence of the fault 911 will cause wavelengths $\lambda 4$ and $\lambda 7$ to be modulated in the upstream and downstream directions, respectively.

In the instant embodiment, each of the wavelength converters 45-1 and 45-2 is adapted to determine, when it fails to sense an optical upstream signal from associated one of the ONUS 3-5 and 3-6, that a fault has occurred to switch the wavelength used in the upstream direction to a different wavelength. It is to be noted that the invention is not restricted to this example. The OHFs 13-1 to 13-3 are adapted to comply with the redundancy or diversity configuration even when the wavelength converter 45-1 or 45-2 changes its wavelength upon occurrence of a failure.

With the illustrative embodiment described above, the wavelength converters 45-1 and 45-2 are physically separate from the ONUS 3-5 and 3-6. The wavelength converters 45-1 and 45-2 may not be restricted to this example. For instance, the wavelength converters 45-1 and 45-2 may be incorporated in the structure of wavelength converters ONU 3-5 and ONU 3-6, respectively. That is, in one subassembly, the wavelength converter 45-1 is incorporated in the ONU 3-5. In another subassembly, the wavelength converter 45-2 is incorporated in the ONU 3-6.

Figure 7:
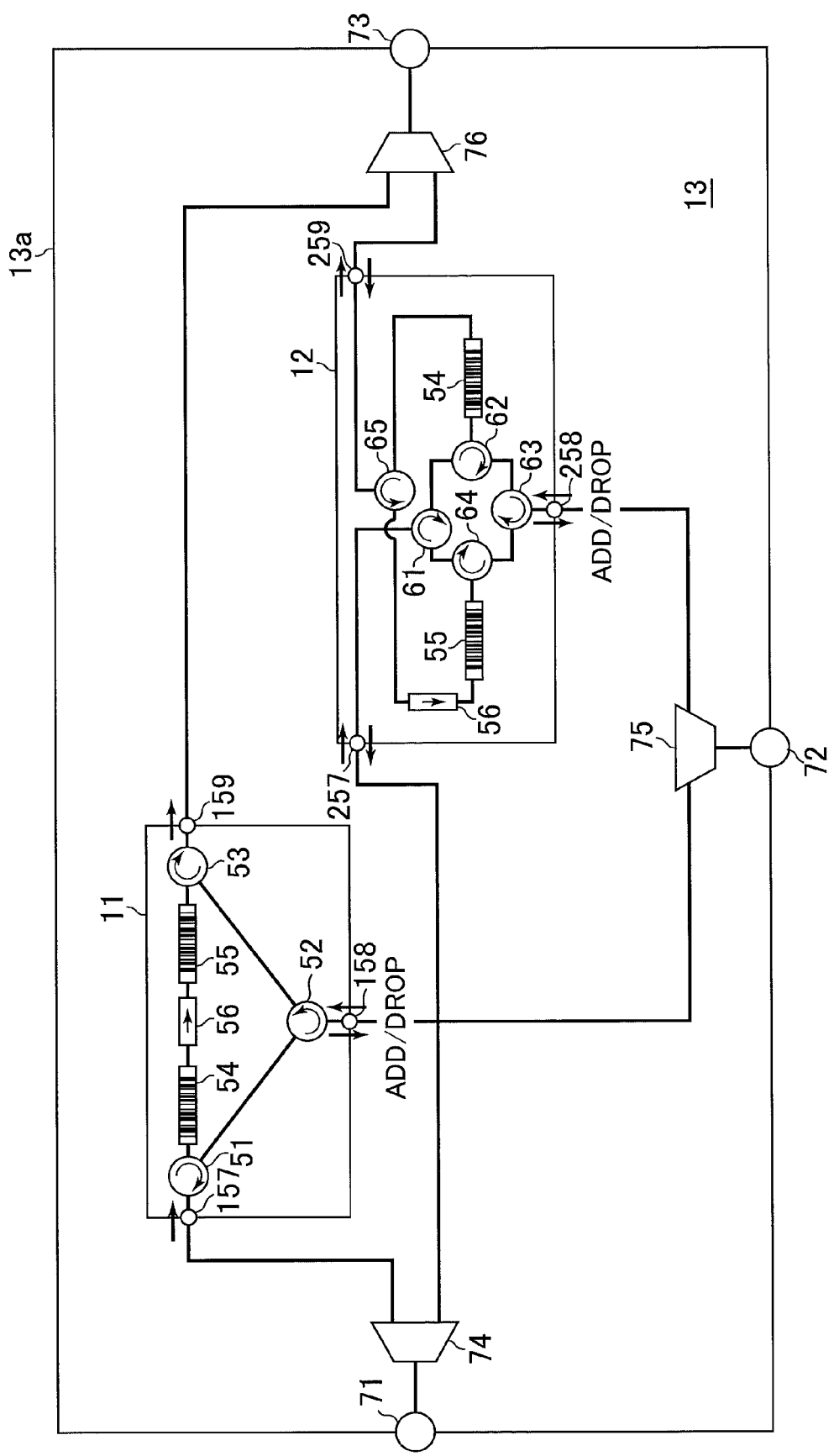
FIG. 7 is a schematic plan view showing the internal circuit configuration of an OHF according to the third embodiment.

The OHFs 13-1 to 13-3 of the third embodiment may be identical to each other in internal configuration. FIG. 7 shows the internal structure of one OHF 13 as a representative in a plan view. As illustrated in the figure, the OHF 13 has ports 71-73, WDM filters 74-76, an OHF subsection 11 complying with a ring topology, and an OHF subsection 12 complying with a cascade topology, which are disposed on a substrate 13a. The WDM filters 74, 75 and 76 may be understood as wave combiner/separators.

The ring topology-compliant OHF subsection 11 may be the OHF 11 in accordance with the first embodiment described earlier. A repetitive description of the internal configuration of the ring topology-compliant OHF subsection 11 is therefore omitted. The ring topology-compliant OHF subsection 11 has its input/output ports 157, 158, and 159 interconnected to the WDM filters 74, 75 and 76, respectively.

The cascade topology-compliant OHF subsection 12 may be the OHF 12 in accordance with the second embodiment described earlier. A repetitive description of the internal configuration of the cascade topology-compliant OHF subsection 12 is therefore omitted. The cascade topology-compliant OHF subsection 12 has its input/output ports 257, 258 and 259 interconnected to the WDM filters 74, 75 and 76, respectively.

The WDM filters 74-76 function as combining or dividing incoming optical signals. The operation of the WDM filters 74-76 will be described in detail later. Briefly, for example, the WDM filter 75 of the OHF 13-1 shown in FIG. 6 operates, upon receiving an optical signal from the port 72, to develop optical signals having wavelengths of $\lambda 1$ and $\lambda 2$ to the ring topology-compliant OHF subsection 11 and the cascade topology-compliant OHF subsection 12, respectively.

The port 71 is connected to the WDM filter 74. The port 72 designed to be connected to an ONU 3 is connected to the WDM filter 75. The port 73 is connected to the WDM filter 76.

The operation of the third, alternative embodiment will be described in detail with reference to FIGS. 6 and 7-10. It will first be described with reference to FIG. 6 how to accomplish redundancy in the third embodiment.

In the system shown in FIG. 6, prior to a fault occurring, a downstream optical signal, $\lambda 5$-Code1, directed to the OHF 13-1 from the central office 2 passes into the OHF 13-1 through the WDM node 4. The OHF 13-1 decodes the optical signal. The decoded downstream signal is sent to the ONU 3-5 as indicated by the arrow (21) in the figure.

On the other hand, an upstream signal, $\lambda 1$, from the ONU 3-5 is encoded by the OHF 13-2. The encoded optical signal, $\lambda 1$-Code1, passes through the OHF 13-3 and the WDM node 4, and is then sent to the central office 2 as indicated by the arrow (22) in FIG. 6.

Prior to occurrence of a fault, a downstream optical signal, $\lambda 5$-Code2, directed to the ONU 3-6 from the central office 2 passes through the WDM node 4 and through the OHF 13-1, and enters the OHF 13-2. The OHF 13-2 decodes that optical signal. The decoded downstream signal is sent to the ONU 3-6 as indicated by the arrow (23) in FIG. 6.

On the other hand, the upstream optical signal, $\lambda 1$, from the ONU 3-6 is encoded by the OHF 13-2. The encoded optical signal, $\lambda 1$-Code2, passes through the OHF 13-3 and through the WDM node, and is sent to the central office 2 as indicated by the arrow (24) in FIG. 6.

In the system shown in FIG. 6, when a fault 911 has occurred between the OHFs 13-2 and 13-3. From now on, the downstream optical signal directed from the central office 2 to the ONU 3-5 is decoded by the OHF 13-1. The resultant signal travels to the ONU 3-5 in the same way as prior to the occurrence of the fault 911 as indicated by the arrow (21) in the figure. However, the upstream optical signal from the ONU 3-5 in turn takes a different path. More specifically, the upstream optical signal, $\lambda 2$, is encoded by the OHF 13-1. The encoded optical signal, $\lambda 2$, passes through the WDM node 4 and reaches the central office 2 as indicated by the arrow (25) in the figure.

The downstream optical signal, $\lambda 7$, directed from the central office 2 to the ONU 3-6 passes the WDM node 4. The OHF 13-3 decodes the optical signal. The decoded downstream optical signal is transmitted to the ONU 3-6 as indicated by the arrow (26) in FIG. 6.

On the other hand, the upstream optical signal, $\lambda 4$, from the ONU 3-6 is encoded by the OHF 13-3. The encoded optical signal, $\lambda 4$, is sent to the central office 2 via the WDM node as indicated by the arrow (27) in FIG. 6.

Figure 8:
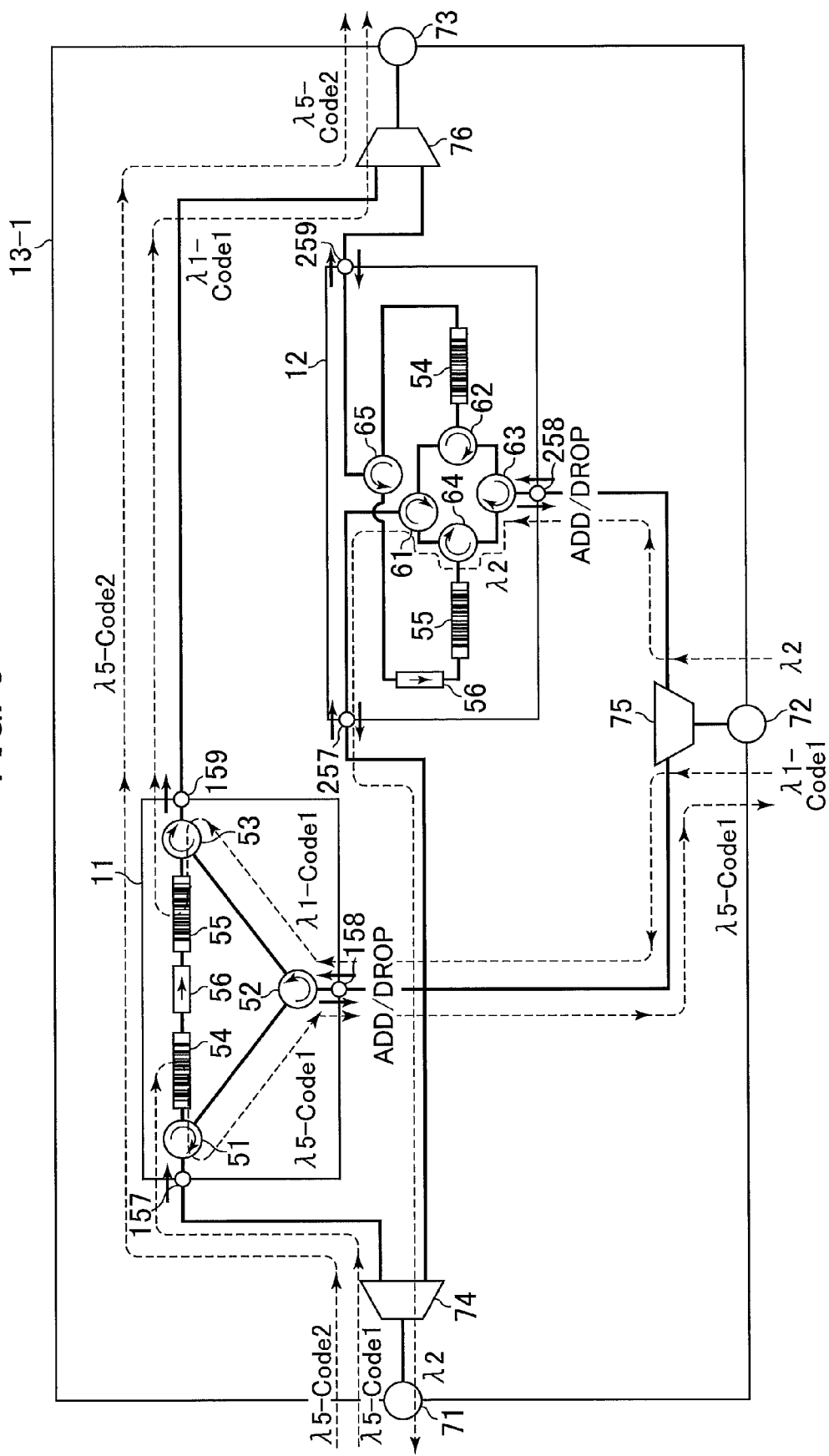
FIGS. 8, 9 and 10 are schematic plan views showing the circuit configuration useful for understanding the operation of the OHFs 13-1, 13-2 and 13-3, respectively, of the third embodiment shown in FIG. 6.
Figure 9:
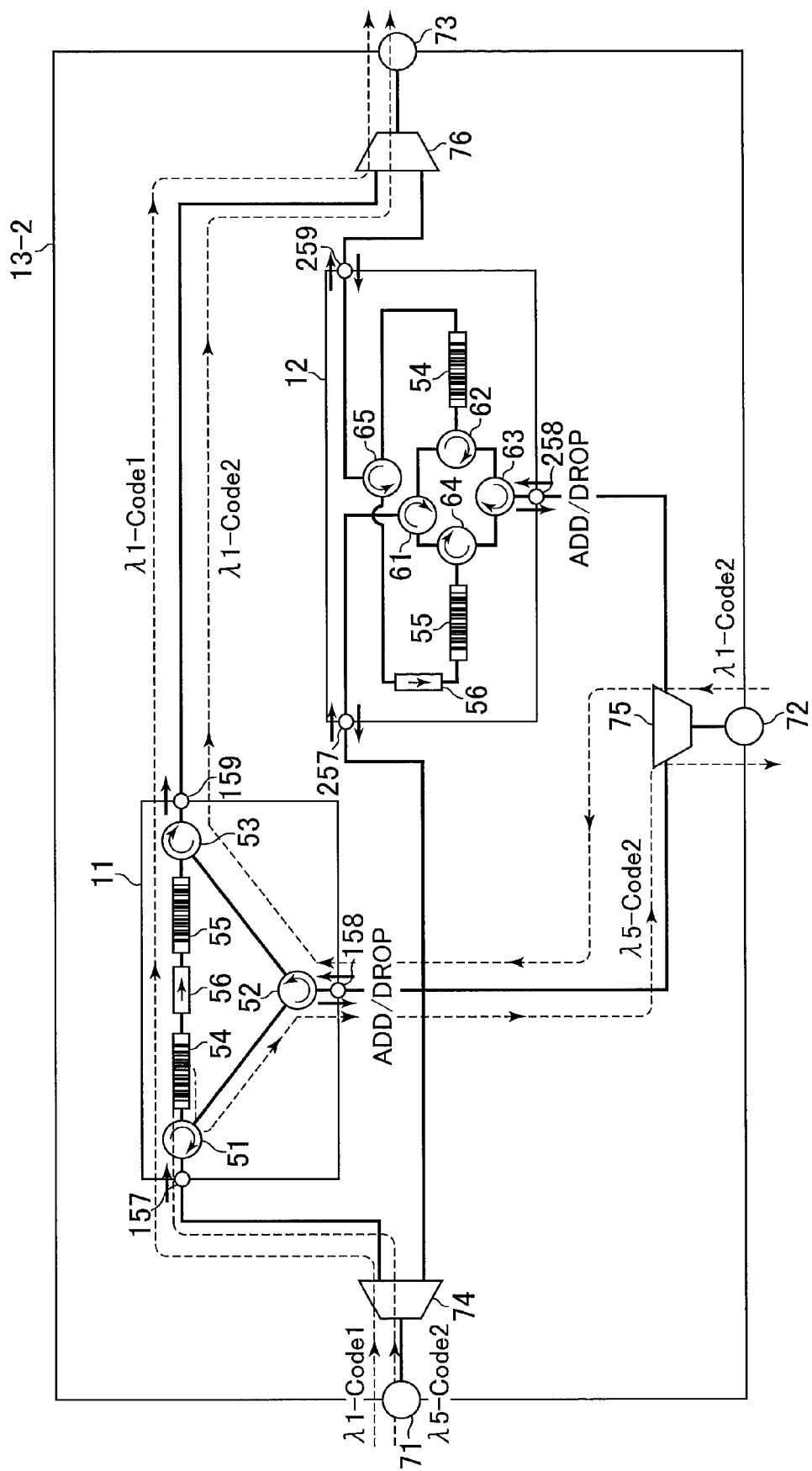
Figure 10:
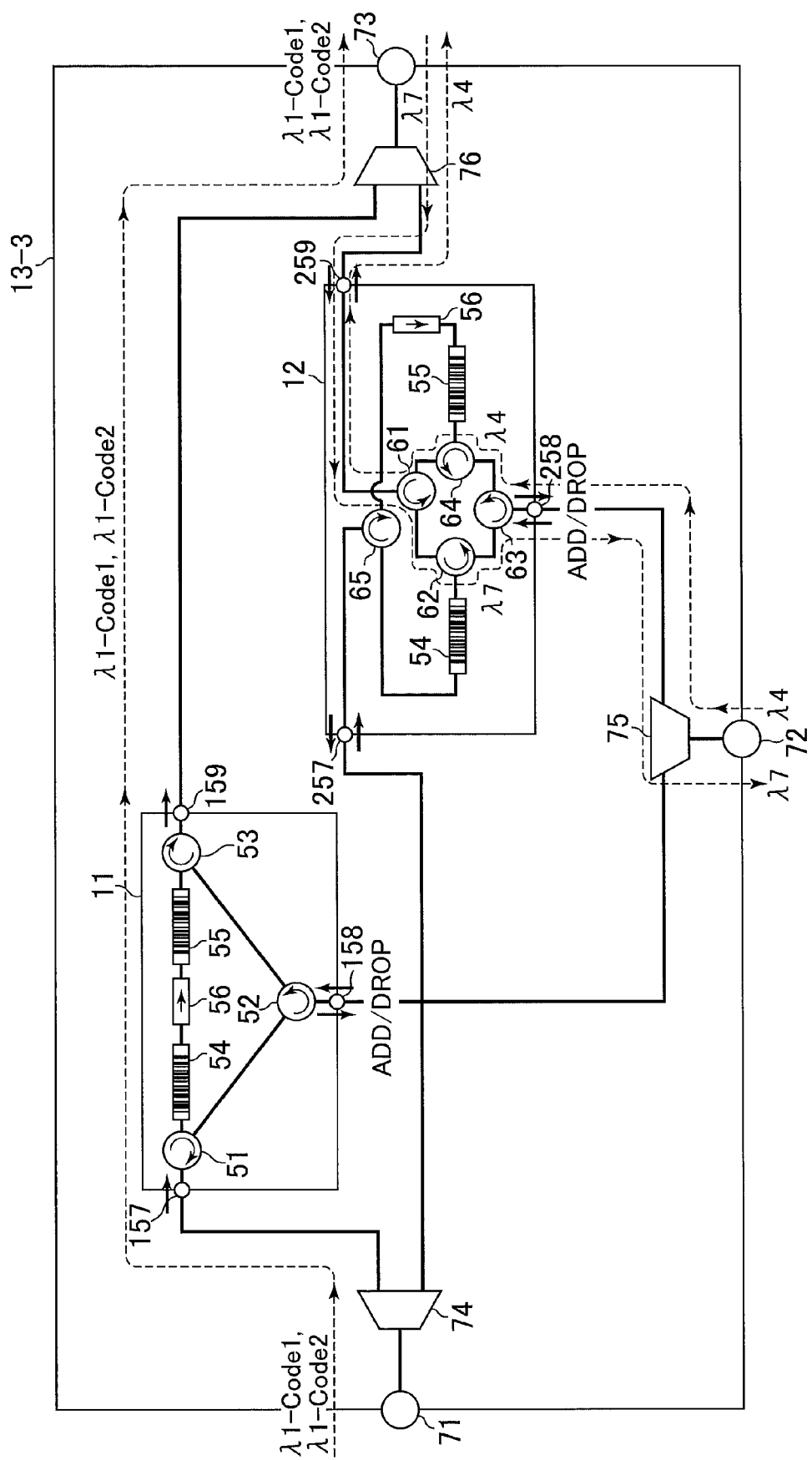

Referring to FIGS. 8-10, the operation of the OHFs 13 of the third embodiment will be described in detail. First, FIG. 8 is for use in illustrating the operation of the OHF 13-1. Before a fault occurs, the downstream optical signal, λ5-Code1, directed to the ONU 3-5 enters on the port 71 and passes into the WDM filter 74.

The WDM filter 74 serves to direct the wavelength λ5 of light to the ring topology-compliant OHF subsection 11. Therefore, the WDM filter 74 outputs the incoming optical signal, λ5, toward the ring topology-compliant OHF subsection 11.

In the ring topology-compliant OHF subsection 11, the optical signal is fed to the circulator 51 and then to the FBG type optical decoder 54, where the signal is in turn decoded. The decoded optical signal passes into the WDM filter 75 via the isolator 56, the FBG type optical encoder 55, the circulator 53 and the circulator 52. Then, the signal is output from the port 72. Thus, the optical signal is sent to the ONU 3-5.

The upstream optical signal, λ1-Code1, from the ONU 3-5 then enters on the port 72 and passes into the WDM filter 75.

The WDM filter 75 functions as outputting the wavelengths λ1 and λ2 of light to the ring topology-compliant OHF subsection 11 and the cascade topology-compliant OHF subsection 12, respectively. Accordingly, the WDM filter 75 conveys the incoming optical signal having wavelength of λ1 to the ring topology-compliant OHF subsection 11.

In the ring topology-compliant OHF subsection 11, the optical signal passes through the circulators 52 and 53 and enters the FBG type optical encoder 55, where the signal is in turn encoded. The encoded optical signal, λ1-Code1, is output via the circulator 53 and passes into the WDM filter 76. The signal is then output from the port 73.

After a fault 911 arises, signals in the downstream direction to the ONU 3-5 remain flowing as before. The upstream signal, λ2, from the ONU 3-5 then enters on the port 72 and passes into the WDM filter 75.

The WDM filter 75 outputs the incoming optical signal having wavelength λ2 to the cascade topology-compliant OHF subsection 12.

In the cascade topology-compliant OHF subsection 12, the optical signal passes through the circulators 63 and 64 and enters the FBG type optical encoder 55, which in turn encodes that signal. The encoded optical signal of λ2 passes through the circulators 64 and 61 and is output to the WDM filter 74. Then, the signal is output from the port 71.

FIG. 9 is for use in illustrating the operation of the OHF 13-2. In this situation, the OHF 13-2 operates only prior to a fault occurring, and, in the OHF 13-2, only the ring topology-compliant OHF subsection 11 operates.

The upstream optical signal, λ1-Code1, from the ONU 3-5 enters on the port 71 and is fed to the ring topology-compliant OHF subsection 11 through the WDM filter 74. In this OHF subsection 11, the optical signal passes through the FBG type optical decoder 54, the isolator 56 and the FBG type optical encoder 55, and is output from the port 73.

The downstream optical signal, λ5-Code2, from the ONU 3-6 enters on the port 71 and passes into the ring topology-compliant OHF subsection 11 through the WDM filter 74. In this OHF subsection 11, the optical signal is supplied via the circulator 51 to the FBG type optical decoder 54, in which the signal is decoded. Then, the optical signal is supplied to the WDM filter 75 via the isolator 56, the FBG type optical encoder 55, the circulator 53 and the circulator 52, and then is output from the port 72.

The upstream optical signal, λ1-Code2, from the ONU 3-6 is input on the port 72 and is output to the ring topology-compliant OHF subsection 11 by the WDM filter 75. In the OHF subsection 11, the optical signal passes through the circulators 52 and 53 and is encoded by the FBG type optical encoder 55. The encoded optical signal is supplied to the WDM filter 76 via the circulator 53 and is output from the port 73.

FIG. 10 is useful for illustrating the operation of the OHF 13-2. After the fault 911 arises, communications between the WDM node 4 and the ONU 3-6 are conducted via the OHF 13-3. Therefore, in the cascade topology-compliant OHF subsection 12 of the OHF 13-3, the connections are reversed although the configuration remains the same.

Before a fault is caused, an upstream optical signal, λ1-Code1, from the ONU 3-5 and an upstream optical signal, λ1-Code2, from the ONU 3-6 enter on the port 71 and are output to the ring topology-compliant OHF subsection 11 through the WDM filter 74. The optical signals pass through the OHF subsection 11 and then through the WDM filter 76, and is output from the port 73.

After the fault 911 is caused, a downstream optical signal, λ7, directed to the ONU 3-2 enters on the port 73 and is output to the cascade topology-compliant OHF subsection 12 through the WDM filter 76.

In the cascade topology-compliant OHF subsection 12, the optical signal passes through the circulators 61 and 62 and enters the FBG type optical decoder 54. The optical signal decoded by the decoder 54 passes through the circulators 62 and 63 to the WDM filter 75, and is output from the port 72.

On the other hand, the upstream optical signal, λ4, from the ONU 3-6 enters on the port 72, and is transferred through the WDM filter 75 into the cascade topology-compliant OHF subsection 12.

In the cascade topology-compliant OHF subsection 12, the optical signal passes into the FBG type optical encoder 55 via the circulators 63 and 64. The signal encoded by the encoder 55 is supplied to the WDM filter 76 via the circulators 64 and 61 and output from the port 73.

As described so far, according to the third, alternative embodiment, it is possible to accommodate both ring topology and cascade topology. As a result, it is possible to accommodate redundancy, for example, using OHFs constituting the same ring topology.

A still another alternative, fourth embodiment of the optical repeater of the present invention will be described in detail by referring to FIGS. 5, 6, 11 and 12. The fourth embodiment pertains to the WDM nodes 4 capable of complying with the redundant configuration attained in the third alternative embodiment.

First, the fourth embodiment will be described by referring to FIGS. 5 and 6 which have been already referenced in connection with the third alternative embodiment. It may be recalled that the third embodiment was described with focus put on the OHFs 13 as capable of accommodating redundant or diverting configuration against case (C). In that configuration, for the downstream direction toward the ONU 3-6 in the system shown in FIG. 6, a different wavelength is used.

Furthermore, prior to occurrence of a fault, the optical signal having wavelength λ5 travels in the counterclockwise direction in FIG. 6, i.e. from the WDM node 4 to the OHF 13-1 and so on, whereas, after the occurrence of the fault 911, the optical signal having wavelength λ7 travels in the clockwise direction in the figure, i.e. from WDM node 4 to OHF 13-3 and so forth. Specifically, the WDM node 4 of the system shown in FIG. 6 is required to send optical signals which are different in wavelength and transmitted in the opposite directions before and after a fault 911 occurs.

Thus, the fourth, alternative embodiment is directed to a passive component applicable to the WDM node 4 in order to comply with the redundant configuration described in connection with the third, alternative embodiment.

Figure 11:
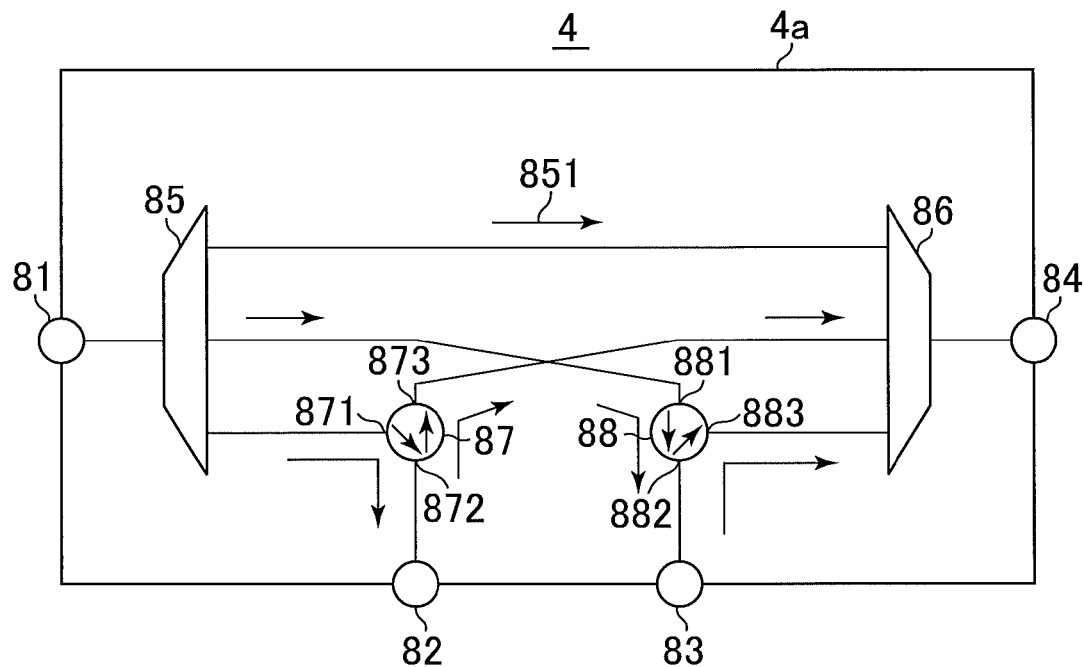
FIG. 11 is a schematic plan view showing the internal circuit configuration of a WDM node according to a fourth illustrative embodiment of the invention.

FIG. 11 shows the internal configuration of the WDM node 4 of the fourth embodiment in a plan view. The WDM node 4 includes four ports 81-84, WDM filters 85 and 86, and circulators 87 and 88, which are arranged on a substrate 4a.

The ports 81 and 82 are connected to optical fibers constituting a network in the first hierarchical layer L1. For example, in the case of FIG. 6, both ports 81 and 82 are connected to the central office 2 so as to form the network in the first hierarchical layer L1.

The ports 82 and 83 are connected to optical fibers constituting a network in the second hierarchical layer L2. For example, in the case of FIG. 6, the ports 82 and 83 are connected to OHFs 13-1 and 13-3, respectively.

The WDM filter 85 is adapted to split an optical signal entering on the port 81 into optical signals having wavelengths $\lambda 5$ and $\lambda 7$, and having other wavelengths 851.

The WDM filter 86 functions to combine an optical signal of $\lambda 1$, an optical signal of $\lambda 2$ or $\lambda 4$ and other optical signals into one, which is in turn output on the port 84.

The circulator 87 has three input/output ports 871-873. The circulator 87 is operative in response to an optical signal input from the WDM filter 85 on its input/output port 871 to output the optical signal on its input/output port 872 so as to develop the signal from the port 82. The circulator 87 is also responsive to an optical signal from the port 82 on its input/output port 872 to develop the optical signal on its input/output port 873 toward the WDM filter 86.

The circulator 88 has three input/output ports 881-883. The circulator 88 is operative in response to an optical signal input from the WDM filter 85 on its input/output port 881 to output the optical signal on its the input/output port 882 so as to develop the signal from the port 83. The circulator 88 is also responsive to an optical signal from the port 83 on its input/output port 882 to develop the optical signal on its the input/output port 883 toward the WDM filter 86.

The operation of the WDM node 4 of the fourth illustrative embodiment will be described with reference to FIG. 12 with the example of redundant configuration taken in connection with the third illustrative embodiment described earlier.

Figure 12:
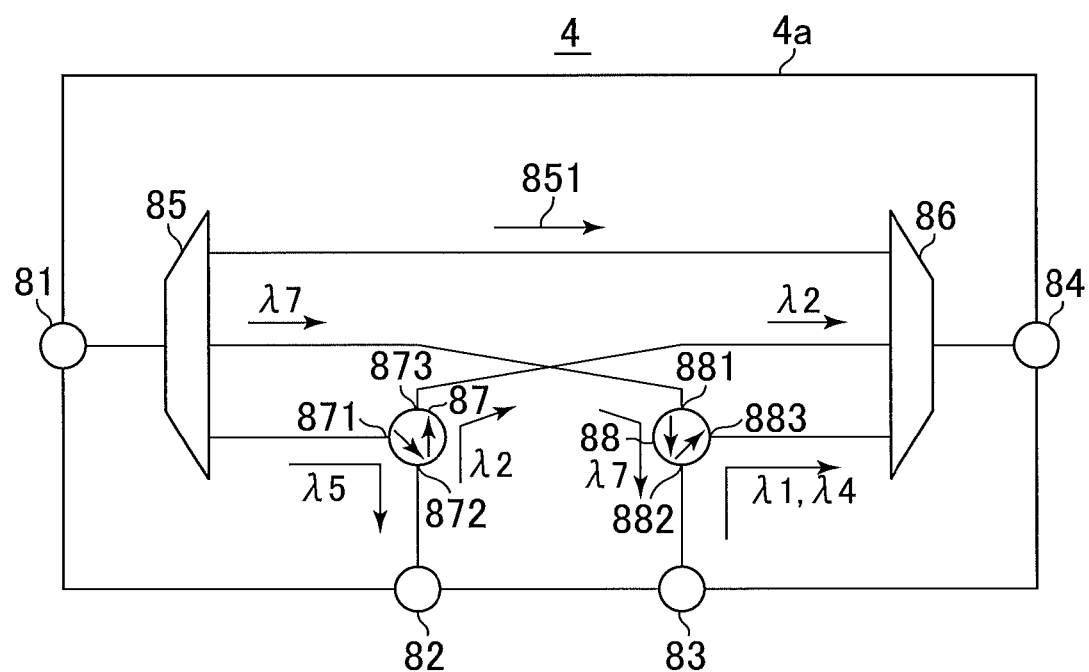
FIG. 12 is a schematic plan view showing the circuit configuration useful for understanding the operation of the WDM node of the fourth embodiment shown in FIG. 11.

FIG. 12 is for use in illustrating the operation of the WDM node 4 of the fourth embodiment. Referring also to FIG. 6, prior to a fault occurring, a downstream optical signal, $\lambda 5$-Code1, directed to the ONU 3-5 and a downstream optical signal, $\lambda 5$-Code2, directed to the ONU 3-6 are entered on the port 81 and pass into the WDM filter 85. The WDM filter 85 outputs an optical signal of wavelength $\lambda 5$ to the circulator 87 and outputs other optical signals to the WDM filter 86.

In the circulator 87, the optical signal from the WDM filter 85 passes into the input/output port 871, and is output from the input/output port 872 so as to exit from the port 82. Consequently, the optical signal of the wavelength $\lambda 5$ can be output toward the OHF 13-1.

The upstream optical signal, $\lambda 1$-Code1, from the ONU 3-5 and the upstream optical signal, $\lambda 1$-Code2, from the ONU 3-6 enter on the port 83 and pass into the circulator 88. In the circulator 88, the optical signal from the port 83 enters the input/output port 882, and is output from the input/output port 883 so as to exit to the WDM filter 86. The filter 86 combines this signal with optical signals of other wavelengths 851 into one, which is in turn output from the port 84.

After a fault 911 occurs, the downstream optical signal, $\lambda 5$-Code1, directed to the ONU 3-5 takes the same path as prior to the occurrence of the fault 911.

The downstream optical signal, $\lambda 7$, directed to the ONU 3-6 has to exit in a direction opposite to the direction taken prior to the occurrence of the fault 911 over the network in the second hierarchical layer L2. That is, the downstream optical signal, $\lambda 7$, meant for the ONU 3-6 enters on the port 81 and passes into the WDM filter 85, which in turn delivers the optical signal of the wavelength $\lambda 7$ to the circulator 88.

In the circulator 88, the optical signal from the WDM filter 85 enters on the input/output port 881, and is output from the input/output port 882, so as to exit from the port 83. That allows the optical signal of the wavelength $\lambda 7$ to be transmitted toward the OHF 13-3.

The upstream optical signal, $\lambda 2$, from the ONU 3-5 is required to travel in a direction opposite to the direction taken prior to the fault 911 occurring on the network in the second hierarchical layer L2. That is, the upstream optical signal, $\lambda 2$, from the ONU 3-5 enters on the port 82 and passes into the circulator 87.

When the circulator 87 receives the optical signal from the port 82 on its input/output port 872, it develops the signal on its input/output port 873 to the WDM filter 86. The WDM filter 86 combines the signal with optical signals of other wavelengths 851 into one, which is in turn output from the port 84.

The upstream optical signal, $\lambda 4$-Code2, from the ONU 3-6 enters on the port 83 and passes into the circulator 88. In the circulator 88, the optical signal from the port 83 enters on the input/output port 882 and is output from the input/output port 883 to the WDM filter 86. The WDM filter 86 combines this signal with optical signals of other wavelengths 851 into one, which will in turn be output from the port 84.

On the network in the first hierarchical layer L1, the optical signal of a wavelength corresponding to a WDM node next to the WDM node 4 is transmitted directly from the port 81 to the port 84.

In summary, according to the fourth illustrative embodiment, signals can be input and output in either of the directions, i.e. bidirectionally, of the network of the ring topology in the second hierarchical layer L2. Redundancy or diversity configuration can be switched, i.e. enabled and disabled, by means of passive components.

It is to be noted that the internal configurations of the OHFs and the WDM nodes of the illustrative embodiments described above are merely illustrative. The invention may not be restricted to those specific internal configurations. For example, the circulators may be replaced by any other passive components as long as they are modules that can convert optical paths. Likewise, the WDM filters may be replaced by passive components so far as they can divide or combine wavelengths of light.

The entire disclosure of Japanese patent application No. 2011-215232 filed on Sep. 29, 2011, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. An optical repeater passively relaying a multiplexed optical signal, comprising:
   a first and a second input/output port each receiving and outputting the multiplexed optical signal;
   an optical decoder decoding the multiplexed optical signal to a first optical signal;
   a first optical path switch outputting the multiplexed optical signal to said optical decoder and outputting the first optical signal entering from said optical decoder;

a second optical path switch outputting the first optical signal received from said first optical path switch to a termination unit connected to said repeater and outputting a second optical signal delivered from the termination unit;

an optical encoder encoding the second optical signal to a third optical signal;

a third optical path switch outputting the second optical signal entering from said second optical path switch to said optical encoder and outputting the third optical signal;

a fourth optical path switch outputting the multiplexed optical signal received on said first input/output port to said first optical path switch and outputting the third optical signal delivered from said third optical path switch to said first input/output port; and a fifth optical path switch outputting the multiplexed optical signal received on said second input/output port to said optical encoder and outputting the first optical signal delivered from said optical decoder to said second input/output port.

2. The repeater in accordance with claim 1, further comprising a third input/output port outputting the first optical signal to the termination unit and receiving the second optical signal from the termination unit.

3. The repeater in accordance with claim 1, further comprising an isolator conveying the multiplexed optical signal from said fifth optical path switch to said optical encoder and blocking the third optical signal from being transferred to said fifth optical path switch.

4. The repeater in accordance with claim 1, wherein said optical decoder and said optical encoder are of a fiber Bragg grating (FBG) type.

5. An optical repeater arrangement comprising:

a first and a second input/output port each receiving and outputting the multiplexed optical signal; and a first and a second optical repeater each passively relaying a multiplexed optical signal, wherein said first optical repeater comprises:

a first optical decoder decoding the multiplexed optical signal to a first optical signal;

a first optical path switch outputting the multiplexed optical signal to said first optical decoder and outputting the first optical signal;

a second optical path switch outputting the first optical signal received from said first optical path switch to a termination unit connected to said repeater arrangement and outputting a second optical signal delivered from the termination unit;

a first optical encoder encoding the second optical signal to a third optical signal; and a third optical path switch outputting the optical signal to said first optical encoder and outputting the second optical signal, said second optical repeater comprising:

a second optical decoder decoding the multiplexed optical signal to a fourth optical signal;

a fourth optical path switch outputting the multiplexed optical signal to said second optical decoder and outputting the fourth optical signal entering from said second optical decoder;

a fifth optical path switch outputting the fourth optical signal received from said fourth optical path switch to the termination unit and outputting the second optical signal delivered from the termination unit;

a second optical encoder encoding the fifth optical signal to a sixth optical signal;

a sixth optical path switch outputting the fifth optical signal entering from said fifth optical path switch to said second optical encoder and outputting the sixth optical signal;

a seventh optical path switch outputting the multiplexed optical signal received on said first input/output port to said fourth optical path switch and outputting the sixth optical signal delivered from said sixth optical path switch to said first input/output port; and an eighth optical path switch outputting the multiplexed optical signal received on said second input/output port to said second optical encoder and outputting the fourth optical signal delivered from said second optical decoder to said second input/output port, said arrangement further comprising:

a third input/output port outputting the first or fourth optical signal to the termination unit and receiving the second optical signal from the termination unit;

a first wave combiner/separator separating wavelengths of the multiplexed optical signal entering on said first input/output port to output the separated wavelengths of optical signal to said first optical repeater and said second optical repeater, and combining the multiplexed optical signals entering from said first optical repeater and said second optical repeater into a single optical signal to output the single optical signal to said first input/output port;

a second wave combiner/separator separating wavelengths of the second optical signal received from the termination unit on said third input/output port to output the separated wavelengths of optical signal to said first optical repeater and said second optical repeater, and outputting the second and fourth optical signals entered respectively from said first optical repeater and said second optical repeater to said third input/output port; and a third wave combiner/separator separating wavelengths of the multiplexed optical signal received on said third input/output port to output the separated wavelengths of optical signal to said first optical repeater and said second optical repeater, and combining the second and fourth optical signals delivered respectively from said first optical repeater and said second optical repeater into a single optical signal so as to output the single optical signal to said second input/output port.

6. The arrangement in accordance with claim 5, wherein said first optical repeater further comprises an isolator conveying the first optical signal to said first optical encoder and blocking the third optical signal from being transferred to said first optical decoder.

7. The arrangement in accordance with claim 5, wherein said second optical repeater further comprises an isolator conveying the multiplexed optical signal from said eighth optical path switch to said second optical encoder and blocking the sixth optical signal from being transferred to said eighth optical path switch.

8. The arrangement in accordance with claim 5, wherein said first optical decoder and said first optical encoder are of a fiber Bragg grating (FBG) type.

9. The arrangement in accordance with claim 5, wherein said second optical decoder and said second optical encoder are of a fiber Bragg grating (FBG) type.

* * * * *